United States Patent [19]

Adams

[11] Patent Number: 4,899,055
[45] Date of Patent: Feb. 6, 1990

[54] THIN FILM THICKNESS MEASURING METHOD

[75] Inventor: Arnold Adams, Goleta, Calif.

[73] Assignee: Tencor Instruments, Mountain View, Calif.

[21] Appl. No.: 193,902

[22] Filed: May 12, 1988

[51] Int. Cl.$^4$ .............................................. G01N 21/55
[52] U.S. Cl. .................................... 250/372; 356/318; 356/448
[58] Field of Search ...................... 250/372, 358.1, 339, 250/341; 356/448, 318

[56] References Cited

U.S. PATENT DOCUMENTS

| | | | |
|---|---|---|---|
| 3,016,464 | 1/1962 | Bailey | 356/448 |
| 3,325,649 | 6/1967 | Bird | 250/372 |
| 4,352,017 | 9/1982 | Duffy et al. | 250/372 |
| 4,511,800 | 4/1985 | Harbeke et al. | 250/372 |
| 4,659,933 | 4/1987 | Anthon . | |

OTHER PUBLICATIONS

Wesson et al., "Phase-Shift-Corrected Thickness Determination of Silicon Dioxide on Silicon by Ultraviolet Interference", Journal of Applied Physics, pp. 2455–2460, 1967.
Chiang et al., "Optical Evaluation of Polycrystalline Silicone Surface Roughness", Journal of the Electrochemical Society, pp. 2267–2268, 1979.
Duffy et al., "Measurement of the Near-Surface Crystallinity of Silicon on Sapphire by UV Reflectance", Journal of Crystal Growth, pp. 10–18, 1982.
Harbeke et al., "Rapid Characterization of Polysilicon Films by Means of a UV Reflectometer", RCA Review, vol. 44, pp. 19–29, Mar. 1983.

Primary Examiner—Carolyn E. Fields
Attorney, Agent, or Firm—Thomas Schneck

[57] ABSTRACT

A method of measuring thin film thickness, especially on semiconductor substrates, in which the substrate is illuminated with ultraviolet light of a fixed wavelength corresponding to a persistent spectral line and the amount of light reflected from the substrate is detected and measured. The ultraviolet light preferably has a wavelength in the range from 240 nm to 300 nm, and the 253.6 nm spectral line of mercury is considered best. Comparing the measured amount of light from the substrate to a known amount of light detected from a standard calibration substrate with known reflectivity, the reflectivity of the test substrate is computed. The thickness of a thin film on the substrate is determined from the computed reflectivity using Fresnel's equation or a lookup table derived from the same.

7 Claims, 1 Drawing Sheet

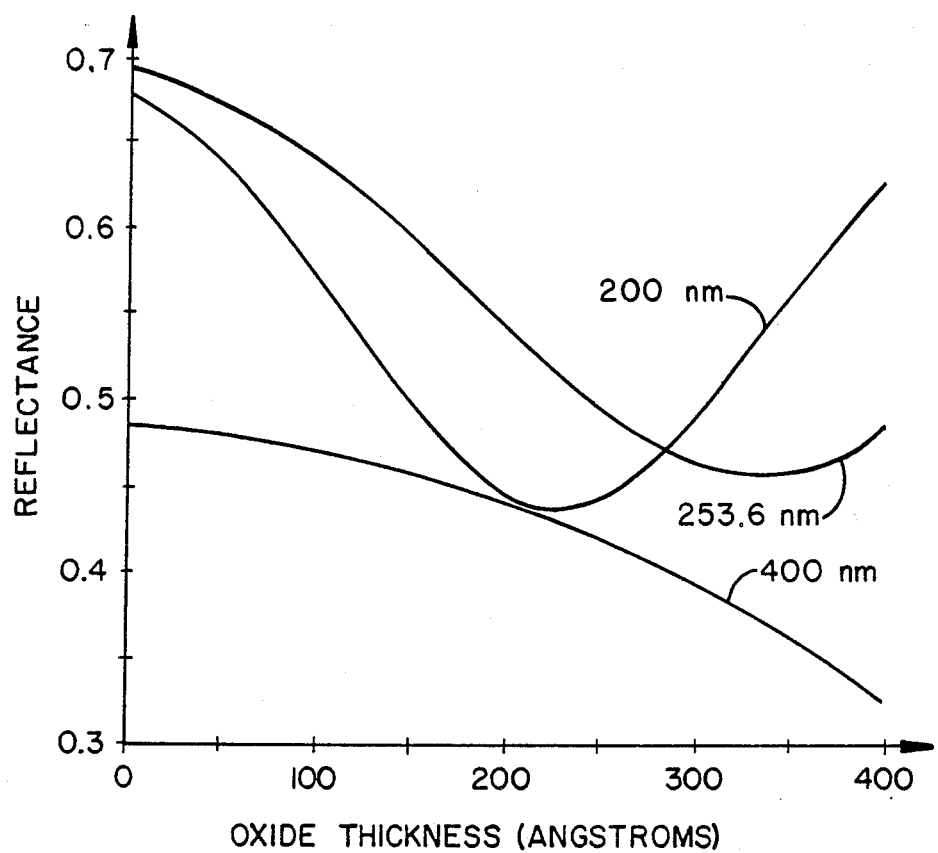
FIG._1.
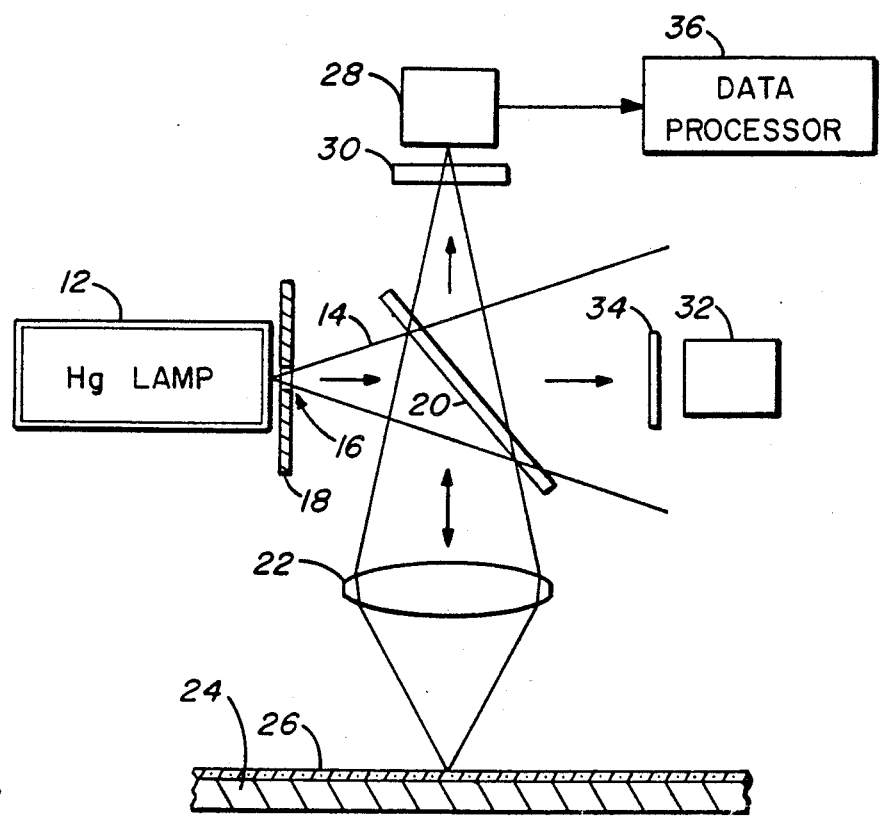
FIG._2.

THIN FILM THICKNESS MEASURING METHOD

TECHNICAL FIELD

The present invention relates to optical measuring and testing and in particular to measuring of thickness of thin films by means of reflection of light incident on the films.

BACKGROUND ART

The precise measurement of very thin films, i.e. films 300 Å thick or less, is extremely important in the semiconductor industry. Such films may be present on a semiconductor by design, or in some cases, they may be there in the form of contamination. In particular, accurate thickness measurement of silicon dioxide films on monocrystalline and polycrystalline silicon in the range from 50 to a few hundred angstroms is very important, as these films are used as gate oxides and floating gate oxides. Likewise, nitrides and oxynitrides of comparable thickness may be used where improved dielectric breakdown strength is needed. As another example, in certain cleaning steps it is required that no residues be left on a wafer. These residues may range from monomolecular layers to layers several hundred angstroms thick. In this case, a precise thickness measurement is not as important as a positive confirmation of their presence. Similar problems in GaAs, GaAlAs and other semiconductors also require thin film measurement.

Reflectivity measurements on silicon and other semiconductors are routinely made in order to measure the thickness of deposited or grown films. Typically, these reflectivity measurements are made in the visible part of the light spectrum. For relatively thick films, maxima and minima are observed in a plot of reflectivity versus wavelength, due to the light interference taking place in the films. The film thickness can be inferred from the wavelength positions of these various extrema. However, if the film is very thin, no minima or maxima may be observed, and an absolute measurement of the reflectivity must be made to determine film thickness. These absolute reflectivity measurements are usually done in the wavelength range from 400 to 500 nm.

Wesson, Phillips and Pliskin in the *Journal of Applied Physics*, pp. 2455–2460, 1967, describe using an ultraviolet spectrophotometer, with variable wavelength, to measure the film thickness of silicon dioxide several thousand angstroms thick. The location of the minima and maxima were used to determine the thickness. There is, however, relatively little advantage to this approach over the usual visible light measurements, because in this thickness range, the measurements can be done in the visible part of the spectrum with equal accuracy and less difficulty.

Chiang, Dell 'Occa and Schwettmann in the *Journal of the Electrochemical Society*, pp. 2267–2268, 1979, describe making ultraviolet measurements at variable wavelength to infer the roughness of polysilicon layers.

Duffy et al. in *Journal of Crystal Growth*, pp. 10–18, 1982 and Harbeke et al. in *RCA Review*, vol. 44, pp. 19–29, 1983, describe an ultraviolet reflectometer used to measure properties of silicon grown on sapphire or polysilicon. The instrument uses a deuterium source with a selection of two wavelengths ($\lambda_1 = 280$ nm, $\lambda_2 = 400$ nm) and measures the reflectivity at both wavelengths. The measured reflectivity is asserted to be affected by absorption due to degraded crystallinity and surface texture at 280 nm, but only by surface texture at 400 nm. Thus, information can be gained about the structure and quality of the films from these measurements.

An object of the present invention is to provide a more accurate method of measuring the thickness of thin films or substrates.

DISCLOSURE OF THE INVENTION

The above object has been met with a method in which the specular reflectivity from a reflective substrate at a single fixed wavelength of ultraviolet light corresponding to a persistent spectral line is measured, and the thickness is accurately determined from this reflectivity. This is more accurate than the previously used method relying on visible light, because the variation in reflectivity for a given change in film thickness is greater for ultraviolet light than for visible light. The method briefly comprises illuminating a portion of a test substrate, particularly a silicon wafer or the like. In all three cases there is usually a thin film thereon whose thickness is to be measured or whose existence is to be determined, then detecting and measuring the amount of light reflected from that portion. The reflectance is then calculated from this measured amount of reflected light by a comparison with the amount of reflected light detected from a standard substrate of known reflectivity. The thickness is in turn determined from the computed reflectivity using either a lookup table or an algorithm based on Fresnel's equation. The thickness determination may be repeated for additional portions of a wafer substrate so as to form a map of the film thickness over the substrate.

In a preferred embodiment, the ultraviolet source is a high brightness mercury discharge lamp emitting the 253.6 nm spectral line.

BRIEF DESCRIPTION OF THE DRAWINGS

FIG. 1 is a graph of reflectance versus oxide film thickness for photon wavelengths of 200 nm, 253.6 nm and 400 nm incident on a silicon substrate with a silicon dioxide film coating.

FIG. 2 is a schematic side view of a reflectometer apparatus for carrying out the method of the present invention.

BEST MODE FOR CARRYING OUT THE INVENTION

With reference to FIG. 1, the present invention involves the determination of the thickness of very thin films on semiconductor substrates by measuring the reflectance of ultraviolet light off of the substrates. Such substrates are either smoothly finished and unpatterned or partially finished with topographic characteristic patterned features, or completely finished. It has not been recognized before that in the ultraviolet region, the variation of the reflection coefficient, for a given change in film thickness, is much more pronounced than in the visible part of the spectrum. The variation is much larger than may be expected from wavelength scaling alone. Nearly all semiconductors, and in particular silicon, exhibit strong electronic transitions in the ultraviolet region, which give rise to large variations in the real and imaginary part of the refractive index. In particular, the media become much more absorptive, and as a result, overcoating with a very thin dielectric layer has a much more pronounced effect on the reflectivity in the ultraviolet wavelength region than it does for the visible wavelength region.

The variation of the reflection coefficient of a film of silicon dioxide on silicon, with increasing thickness, is seen in FIG. 1 for three different wavelengths of incident light, i.e. for 200 nm, 253.6 nm and 400 nm light. The variation of reflectance for 400 nm light is relatively small for a given change in film thickness, the variation ΔR being about 0.005/100 Å for the first 100 Å of oxide and increasing to about 0.06/100 Å in the 200–400 Å range. The variation in reflectance at 253.6 nm is much larger, ΔR being about 0.05/100 Å in the first 100 Å thickness and about 0.10/100 Å in the approximately linear region of 100–300 Å. A steep slope is desired for accurate thickness determination, so it might seem that the optimum wavelength might be near 200 nm. However, other practical considerations make the shorter wavelengths less than ideal. Significant ozone generation occur in air at 240 nm and shorter wavelengths. The optics become expensive when they must be made to transmit light with wavelengths of about 220 nm or less. The detection of the shorter wavelength light with good quantum efficiency also becomes increasingly difficult. Because the desired measurement time is short, and ultraviolet sources are generally weak, it is important to make efficient use of the available light. The preferred ultraviolet-enhanced photodiodes have moderate, but significant, enhancements in quantum efficiency around 250 nm compared to 200 nm or 300 nm. For all of these reasons, it has been found that measurement accuracy is best when using light near 250 nm, and at least between about 240 nm and 300 nm. The persistent spectral line for mercury at about 253.6 nm is considered near ideal because it is bright compared to most ultraviolet spectral lines and relatively inexpensive to produce.

With reference to FIG. 2, an apparatus for carrying out the method for the present invention includes an ultraviolet source 12 emitting ultraviolet light 14 through an aperture 16 in a stop 18. Preferably, source 12 is a high-brightness, low-pressure mercury discharge lamp. The mercury lamp emits a persistent spectral line of 253.6 nm wavelength, which we have discovered is near ideal for the reflectivity measurements. Not only is the wavelength well defined, but the mercury lamp provides an inexpensive, high efficiency, high intensity stable nonionizing UV light source. One such lamp producing a bright output is disclosed in copending application Ser. No. 157,731 of M. Fein, assigned to the assignee of the present invention, for an end viewed gas discharge lamp. Such a lamp is provided with a suitable window which absorbs all wavelengths shorter than 240 nm, thereby eliminating ozone production in the air. Longer wavelengths present in the light emission 14 can be effectively eliminated through any of a variety of well-known wavelength selective means, or the source itself could be filtered to pass only 253.6 nm light. The other spectral lines may also be used to provide a wavelength calibration for spectrometer-type reflectometers.

Other sources, such as cadmium or zinc discharge lamps, could be substituted for the mercury lamp at additional cost. These sources also produce bright spectral lines with narrow well-defined bandwidths, but which are located in different areas of the ultraviolet spectrum. For example, cadmium has persistent spectral lines of 228.8 nm, 298.1 nm, 340.4 nm and 346.6 nm wavelength, while zinc has lines of 213.9 nm, 280.1 nm, 328.2 nm, 330.3 nm and 334.5 nm wavelength. These lines are not as intense as the mercury 253.6 nm line, the shortest lines cause ionization and ozone generation and are harder to detect, and the lines with wavelengths longer than 325 nm are not nearly as optimum as the mercury 253.6 nm line because the change in reflectance for a given thickness change is less. Accordingly, of the above-mentioned spectral lines, the cadmium 298.1 nm line is considered the next most suitable, after the preferred mercury line.

The source, or part of the source, is imaged by a beamsplitter 20 and objective 22 on a semiconductor wafer 24 or other object of interest, which may or may not have a thin film 26 thereon. The objective 22 comprises one or more ultraviolet transmissive lenses made of quartz, fluorite or some other suitable material or may be a reflecting objective. The optical elements become more expensive for shorter wavelengths, and those that can transmit light with 220 nm wavelength or less are very expensive. Accordingly, based on cost, 220 nm is a commercially practical lower limit for reflection measurements of this invention. The objective 22 is not necessary and collimated light, such as from an ultraviolet emitting laser, could equally well be used. However, customarily, small spots are required for semiconductor work and thus use of objective 22 is preferred.

The light 14 from source 12 illuminates a portion of wafer substrate 24 and is reflected. The percentage of light reflected depends in a known fashion, described by Fresnel coefficients, the wavelength dependent complex refractive index $(n_3, K_3)$ of the substrate material determined from the wavelength $\lambda$ of the illuminating light, the index of refraction at that wavelength of any thin film 26 on the substrate 24, the polarization of the incident light and the thickness of that film. This relation may be written as follows:

$$\text{Reflectance} = R = \frac{A + B \cos((d + \delta)C)}{E + B \cos((d + \delta)C)} \quad (1)$$

Where d = film Thickness
$A = r_{12}^2 + r_{23}^2$
$B = 2r_{12}r_{23}$
$C = 4\pi n_2 \cos\theta_2/\lambda$
$C\delta = \phi_{23}$
$E = 1 + r_{12}^2 r_{23}^2$
$\cos\theta_2 = [1 - (n_1 \sin\theta_1/n_2)^2]^{\frac{1}{2}}$,
$\cos\theta_3 = [1 - (n_1 \sin\theta_1/n_3)^2]^{\frac{1}{2}}$, $$r_{12} \approx \left( \frac{n_1 \cos\theta_2 - n_2 \cos\theta_1}{n_1 \cos\theta_2 + n_2 \cos\theta_1} + \frac{n_1 \cos\theta_1 - n_2 \cos\theta_2}{n_1 \cos\theta_1 + n_2 \cos\theta_2} \right)/2$$

$$r_{23} \approx \left( \frac{n_2 \cos\theta_3 - n_3 \cos\theta_2}{n_2 \cos\theta_3 + n_3 \cos\theta_2} + \frac{n_2 \cos\theta_2 - n_3 \cos\theta_3}{n_2 \cos\theta_2 + n_3 \cos\theta_3} \right)/2$$

where $n_1$, $n_2$ and $n_3$ are respective indices of refraction for air, the thin film and the substrate, where $\theta_1$, $\theta_2$ and $\theta_3$ are the angles from the normal of the direction of light propagation in air, thin film and substrate, respectively, where $\phi_{23}$ is the known phase change of amplitude of the light at the thin film-substrate interface, and where $r_{12}$ and $r_{23}$ are the reflectances of light incident on the air-film and film-substrate boundaries, respectively.

FIG. 1, for example, shows the variation of reflectance versus oxide thickness for silicon dioxide on silicon for three different wavelengths of incident light. The reflected light passes through beamsplitter 20 and is projected on a detector 28. The detector 28 is outfitted with suitable wavelength selection means 30, such as a wavelength filter or a grating for spatially separating the various wavelengths, to look only at the desired 253.6 nm wavelength. Preferably, detector 28 is a photodiode having enhanced quantum efficiency for ultraviolet light of around 250 nm wavelength. Detector 28 produces and transmits an electrical signal corresponding to the amount of light that it detects to a data processor 36 for computing the reflectivity and thickness of any film on the substrate. A reference detector 32 is used to monitor the light output 14 of the lamp 12, preferably looking at the same part of the lamp which is projected onto the specimen 24. Detector 32 is also provided with a suitable filter 34 at 253.6 nm so that only the relevant part of the output spectrum is used for monitoring lamp 12. If desired, other filters for different wavelengths could replace filters 30 and 34 so that the same mercury lamp 12 can be used to measure reflectivity at different wavelengths or used to provide wavelength calibration of spectrometer-type reflectometers.

By making a reference measurement on a standard thin film substrate combination of known reflectivity, the reflectivity of any thin film substrate can be computed as the ratio of the reflected intensities measured by detector 28. The measurement of detector 32 can be used to compensate for fluctuations in light output from source 12. For example, a standard wafer substrate may be silicon with a silicon dioxide coating thereon and having a reflectivity at 253.6 nm of 45 percent. The reflectivity of the standard calibration wafer can be found by other means than the present invention. A reference measurement of the standard substrate using the reflectometer device in FIG. 2 might then result in a signal from detector 28 of 2000 microamperes. If subsequently a wafer of unknown reflectivity is placed in the reflectometer, a portion of that wafer illuminated and the resulting signal from detector 28 is 1000 microamperes, then the reflectivity R of the wafer is computed to be R=(1000/2000)×45%=22.5%. Similarly, a detector count of 4000 microamperes would correspond to a wafer reflectivity R=(4000/2000)×45%=90%.

Once the wafer reflectivity is known, the thickness of any thin film on the wafer substrate is easily determined, since for any given thin film and substrate material the relationship between reflectivity and film thickness is known from the inversion of equation No. 1.

$$d = \frac{1}{C} \cos^{-1}\left[\frac{R \times E - A}{(1 - R) \times B}\right] - \delta$$

Thus, the thickness can either be calculated using an algorithm based on this relationship, or can be obtained from a look up table stored in a read-only computer memory. The thickness obtained is more accurate than that obtained from measurements in the visible area of the light spectrum because the variation of reflectivity for a given thickness change is greater.

I claim:

1. A method of measuring a thickness of thin film on a reflective substrate comprising the steps of:
   illuminating a portion of a test thin film and substrate with ultraviolet light of a fixed wavelength corresponding to a persistent spectral line;
   measuring the intensity of the ultraviolet light reflected from the test thin film and substrate;
   providing a standard reflectivity calibration of a known thickness of the thin film on a substrate of known reflectivity, at the wavelength $\lambda$, the standard calibration including an intensity of reflected ultraviolet light;
   determining the light intensity reflectivity R of the test thin film and substrate by multiplying the known reflectivity $R_0$ by the ratio of the reflected light intensity of the test thin film and substrate divided by the reflected light intensity of the standard reflectivity calibration; and
   determining the thickness d of the thin film in the test thin film and substrate by inversion of the relation for reflectivity R, expressed as a function of the thin film thickness d.

2. The method of claim 1, further comprising the step of choosing said spectral line as the 253.6 nm wavelength line of mercury.

3. The method of claim 1, wherein said step of illuminating comprises illuminating the test combination with ultraviolet light of a wavelength lying in a range from 240 nm to 300 nm.

4. The method of claim 1, wherein said step of determining said thickness d of said thin film comprises obtaining a thickness corresponding to a particular reflectivity in a lookup table.

5. The method of claim 1, wherein said step of determining said thin film thickness d comprises the step of determination of d approximately by the relation $$d = \cos^{-1}[(R.E-A)/(1-R).B]/C - \delta$$

where
$A = r_{12}^2 + r_{23}^2$,
$B = 2r_{12}r_{23}$,
$C = 4\pi[n_2^2 - (n_1\sin\theta_1)^2]^{\frac{1}{2}}/\lambda$,
$C\delta = \phi_{23}$,
$E = 1 + r_{12}^2 r_{23}^2$,
where $n_1$ and $n_2$ are the refractive indices for light of said wavelength $\lambda$ for air and for said thin film, respectively, $\lambda_1$ is the incidence angle for said ultraviolet light that illuminates said thin film, $\phi_{23}$ is the change of phase of light at the interface between said thin film and said substrate, and $r_{12}$ and $r_{23}$ are the amplitude reflection coefficients for light of wavelength $\lambda$ at the exposed surface of the thin film and at the thin film-substrate interface, respectively.

6. The method of claim 1, further defined by repeating the steps of:
   illuminating another portion of said test thin film and substrate,
   measuring the ultraviolet light intensity reflected from said test thin film and substrate,
   providing said standard reflectivity calibration, and
   determining the light intensity reflectivity R, for additional portions of said test thin film and substrate to thereby form a map of thin film thicknesses on said substrate for said test thin film and substrate.

7. A process of using an ultraviolet reflectometer for thin film thickness measurement, the reflectometer having a source of ultraviolet light of fixed wavelength corresponding to a spectral line and an ultraviolet detector communicating with a data processor, the process comprising, directing ultraviolet light emitted from said source toward a test substrate so as to illuminate a portion of the test substrate, detecting light reflected from said test substrate with said ultraviolet detector, the detector transmitting an electrical signal with a signal strength corresponding to the amount of reflected ultraviolet light detected to a data processor, computing with said data processor a reflectivity of said test substrate, said reflectivity being determined to equal the ratio of the signal strength from said detector to the signal strength resulting from measurement of a standard calibration substrate of a known reflectivity times said known reflectivity, and determining from said reflectivity of said test substrate a thickness of a thin film on the illuminated portion of said substrate.

* * * * *

UNITED STATES PATENT AND TRADEMARK OFFICE
CERTIFICATE OF CORRECTION

PATENT NO. : 4,899,055

DATED : February 6, 1990

INVENTOR(S) : Arnold Adams

It is certified that error appears in the above-identified patent and that said Letters Patent is hereby corrected as shown below:

Claim 5, column 6, line 44, "$\lambda_1$ is the incidence angle" should read -- $\theta_1$ is the incidence angle --.

Signed and Sealed this

Twelfth Day of March, 1991

*Attest:*

HARRY F. MANBECK, JR.

*Attesting Officer*     *Commissioner of Patents and Trademarks*